United States Patent
Bruckmeier et al.

(10) Patent No.: US 10,044,032 B2
(45) Date of Patent: Aug. 7, 2018

(54) POLYMER COMPOSITION AS A BINDER SYSTEM FOR LITHIUM-ION BATTERIES

(71) Applicant: Wacker Chemie AG, Munich (DE)

(72) Inventors: Christian Bruckmeier, Munich (DE); Frank Deubel, Munich (DE); Stefan Haufe, Neubiberg (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 15/325,440

(22) PCT Filed: Aug. 26, 2015

(86) PCT No.: PCT/EP2015/069502
§ 371 (c)(1),
(2) Date: Jan. 10, 2017

(87) PCT Pub. No.: WO2016/034464
PCT Pub. Date: Mar. 10, 2016

(65) Prior Publication Data
US 2017/0179478 A1    Jun. 22, 2017

(30) Foreign Application Priority Data

Sep. 4, 2014 (DE) .................. 10 2014 217 727

(51) Int. Cl.
| | | |
|---|---|---|
| *H01M 4/36* | (2006.01) | |
| *C09D 5/24* | (2006.01) | |
| *C09D 133/02* | (2006.01) | |
| *H01M 4/62* | (2006.01) | |
| *H01M 4/38* | (2006.01) | |
| *C09D 145/00* | (2006.01) | |

(52) U.S. Cl.
CPC .............. *H01M 4/366* (2013.01); *C09D 5/24* (2013.01); *C09D 133/02* (2013.01); *C09D 145/00* (2013.01); *H01M 4/386* (2013.01); *H01M 4/622* (2013.01)

(58) Field of Classification Search
None
See application file for complete search history.

(56) References Cited

U.S. PATENT DOCUMENTS

| | | | | |
|---|---|---|---|---|
| 5,567,527 A | * | 10/1996 | Webster ................ | C08F 8/32 427/385.5 |
| 6,593,412 B1 | * | 7/2003 | Rabasco ............... | C08F 218/00 523/201 |
| 7,241,534 B2 | * | 7/2007 | Nishimura ........... | H01M 4/366 429/231.1 |
| 2002/0012850 A1 | | 1/2002 | Schmidt et al. | |
| 2004/0126668 A1 | | 7/2004 | Nishimura et al. | |
| 2016/0126538 A1 | | 5/2016 | Hanelt et al. | |

FOREIGN PATENT DOCUMENTS

| | | |
|---|---|---|
| DE | 10027626 A1 | 12/2001 |
| DE | 102013211388 A1 | 12/2014 |
| JP | 6223842 A | 8/1994 |
| WO | 2013082383 A1 | 6/2013 |
| WO | 2013156888 A1 | 10/2013 |

OTHER PUBLICATIONS

Machine translation of JP 06-223842, retrieved Mar. 2018. (Year: 2018).*
English language abstract for JP 6223842 A (1994).
Baskova et al., "Copolymerization of vinylene carbonate with acrylic and methacrylic acids", Vysokomolekulyarnye Soedineniya, Seriya B: Kratkie Soobscheniya 10(3): pp. 220-222 (1968).
Ding et al., "Properties and synthesis of new supports for immobilization of enzymes by copolymerization of vinylene carbonate and methacrylic acid", Chinese Journal of Polymer Science 18(4): pp. 343-349 (2000).
Hayashi et al., "Copolymerization of vinylene carbonate", Journal of Polymer Science 27 (115): pp. 275-283 (1958).
Kasavajjula et al., "Nano—and bulk-silicon-based insertion anodes for lithium-ion secondary cells", Journal of Power Sciences 163: pp. 1003-1039 (2007).
Magasinski et al., "Toward efficient binders for Li-ion battery Si-based anodes: polyacrylic acid", ACS applied materials & interfaces 2(11): pp. 3004-3010 (2010).
Ouatani et al., "The effect of vinylene carbonate additive on surface film formation on both electrodes in Li-ion batteries", Journal of The Electrochemical Society 156(2): pp. A103-A113 (2009).
Zhao et al., "A polymerized vinylene carbonate anode binder enhances performance of lithium-ion batteries", Journal of Power Sources 263: pp. 288-295 (2014).
International Search Report from corresponding PCT/EP2015/069502 dated Nov. 10, 2015.

* cited by examiner

*Primary Examiner* — Nicole M Buie-Hatcher
(74) *Attorney, Agent, or Firm* — Caesar Rivise, PC

(57) ABSTRACT

The invention relates to an electrode coating for a lithium-ion battery, containing copolymer C or the salt thereof, copolymer C being synthesized by polymerizing a combined total of more than 70 wt % of vinyl-functional cyclic carbonate and one or more monomers from the group comprising acrylic acid and the derivatives thereof, the percentage by weight of vinyl-functional cyclic carbonate in relation to the weight of all monomers used being 5-90%.

8 Claims, No Drawings

POLYMER COMPOSITION AS A BINDER SYSTEM FOR LITHIUM-ION BATTERIES

CROSS-REFERENCE TO RELATED APPLICATIONS

This application is a U.S. National Phase Application of PCT/EP2015/069502, filed Aug. 26, 2015, which claims priority to DE 10 2014 217 727.8, filed Sep. 4, 2014, the contents of which applications are incorporated herein by reference in their entireties for all purposes.

BACKGROUND OF THE INVENTION

The invention relates to an electrode coating for a lithium ion battery, which contains a copolymer of vinyl-functional cyclic carbonate and acrylic acid or acrylic acid derivatives.

Owing to their high energy densities, lithium ion batteries are among the most promising energy stores for mobile applications. The fields of use extend from high-quality electronic appliances through to batteries for motor vehicles having electric drive and a stationary power store.

The development of high-performance anode materials for Li ion batteries requires the development of compatible binder systems at the same time. The PVDF used for graphite electrodes is not suitable for use silicon-containing electrodes because of chemical and mechanical instability. This shows up in a poor electrochemical cyclic behavior. To be able to accommodate the extreme volume change (up to about 300%), experienced by silicon on lithiation/delithiation and the associated mechanical stress, binder systems which can be processed aqueously, for example sodium carboxymethylcellulose (Na-CMC), polyvinyl alcohols, acrylates or mixtures of Na-CMC with styrene-butadiene rubbers, have been described as an alternative. Standard binder systems frequently display a high capacity loss over charging and discharging cycles, in particular at high loadings per unit area. In particular, a high irreversible capacity loss occurs during charging and discharging cycles. As causes of this, electrolyte decomposition and a resulting large rise in the internal resistance have frequently been discussed (Zhao et al., Journal of Power Sources (2014) 263, 288-295).

In anodes for lithium ion batteries in which the electrode active material is based on silicon as material having the highest known storage capacity for lithium ions, the silicon experiences an extreme volume change of about 300% during charging or discharging. This volume change results in a high mechanical stress on the total electrode structure and this leads to electronic decontacting of the active material and thus to destruction of the electrode with a capacity loss. Furthermore, the surface of the silicon anode material used reacts with constituents of the electrolyte with a continuous, irreversible lithium loss and (subsequent) formation of passivating protective layers (solid electrolyte interface; SEI).

To solve these problems which are known specifically for Si-based anodes, various approaches for the electrochemical stabilization of Si-based electrode active materials have been pursued in recent years (A. J. Appleby et al., J. Power Sources 2007, 163, 1003-1039).

With a view to applications in electromobility, the requirement for high reversibility at high cycle numbers (>100 cycles) and high loadings (>2 mAh/cm$^2$) is still the greatest challenge.

Apart from the issue of decontacting due to binder weakness, electrolyte decomposition, in particular, plays an important role at high cycle numbers. Over the course of numerous cycles, this leads to a decrease in the capacity due to increasing resistances through to what is referred to as dry running of the cell.

Apart from specific electrolytes, the binder also plays an important role here and has to be appropriately adjusted in order to allow, in conjunction with further improvements such as suitable additives and improved electrolytes, use of silicon anodes in lithium ion batteries for, in particular, automobile applications.

PVDF as standard binder, as is employed in classical graphite anodes, is unsatisfactory in the case of silicon-containing anodes.

Zhao et al. (Journal of Power Sources (2014) 263, 288-295) describe the use of polymeric vinylene carbonate (polyVC) as binder for graphite anodes. PolyVC was already identified in previous work as the primary SEI component in graphite anodes (J. Electrochem. Soc. 156 (2009) A103-A113) In studies by Zhao et al. it was able to be shown that polyVC aids SEI formation and reduces electrolyte decomposition. Reduced electrolyte decomposition leads to a thinner SEI and thus to a slower increase in the internal resistance during cycling. In this way, a higher capacitive retention at high cycle numbers is achieved.

The use of polyVC as binder as in the abovementioned example for graphite anodes cannot be applied to silicon anodes. For reasons which have not been elucidated, polyVC in combination with silicon as anode active material leads to a rapid breakdown of the cycling stability.

The copolymerization of VC with acrylic acid and methacrylic acid has been described by Baskova et al. (Vysokomolekulyarnye Soedineniya, Seriya B: Kratkie Sooshcheniya (1968), 10(3), 220-2), and the copolymerization of VC with (meth)acrylic esters may be found, for example, in Smets et al (Jour. Pol. Sci., Vol 27, pp 275-283 (1958)).

Copolymers of vinylene carbonate and (meth)acrylic esters have hitherto been used in lithium ion batteries only as electrolyte constituent which can be polymerized in-situ in the cell (US2004/0126668 A1), but not as binder for the anode material.

DESCRIPTION OF THE INVENTION

The invention provides an electrode coating for a lithium ion battery, which coating contains copolymer C which can be prepared by polymerization of together more than 70% by weight of vinyl-functional cyclic carbonate and one or more monomers from the group consisting of acrylic acid and derivatives thereof, where the proportion by weight of vinyl-functional cyclic carbonate based on the weight of all monomers used is 5-90%, or contains the salt thereof.

Copolymer C can preferably be prepared by free-radically initiated polymerization.

Derivatives of acrylic acid are, in particular, esters of acrylic acid, alkali metal and alkaline earth metal salts of acrylic acid or methacrylic acid and esters and alkali metal or alkaline earth metal salts thereof or crotonic acid and esters thereof and alkali metal and alkaline earth metal salts thereof, or butenedioic acid (=fumaric acid or maleic acid) and the anhydride thereof (=maleic anhydride) and esters and alkali metal or alkaline earth metal salts thereof.

Suitable esters of acrylic acid and acrylic acid derivatives are, for example, esters of unbranched or branched alcohols having from 1 to 15 carbon atoms. Preferred esters are methacrylic esters or acrylic esters, in particular methyl acrylate, tert-butyl acrylate, tert-butyl methacrylate, methyl methacrylate, ethyl acrylate, ethyl methacrylate, propyl acrylate, propyl methacrylate, n-butyl acrylate, n-butyl methacrylate, 2-ethylhexyl acrylate, 2-ethylhexyl methacrylate. Particular preference is given to methyl acrylate, methyl methacrylate, n-butyl acrylate and 2-ethylhexyl acrylate.

The proportion by weight of acrylic acid and acrylic acid derivatives based on the weight of all monomers used is preferably 10-95%, particularly preferably 30-85%, in particular 70-40%.

Suitable vinyl-functional cyclic carbonates are, for example, vinylene carbonate (1,3-dioxol-2-one, VC for short), 4-methylvinylene carbonate, 4,5-dimethylvinylene carbonate, vinylethylene carbonate (4-vinyl-1,3-dioxolan-2-one), 4-chlorovinylene carbonate, 4,5-dichlorovinylene carbonate, 4-fluorovinylene carbonate, 4,5-difluorovinylene carbonate, methylene ethylene carbonate (4-methylene-1,3-dioxolan-2-one) and 4-hydroxymethylvinylene carbonate. As vinyl-functional cyclic carbonate, particular preference is given to vinylene carbonate, the simplest unsaturated cyclic carbonic ester.

The proportion by weight of vinyl-functional cyclic carbonates based on the weight of all monomers used is preferably 15-70%, particularly preferably 30-60%.

When copolymer C can be prepared using further monomers, then these further monomers, which make up less than 30% by weight of the monomers or preferably less than 5% by weight of the monomers, are preferably selected from among N-methylolacrylamide, butadiene, ethylene, acrylonitrile, styrene, ethylene glycol diacrylate and hexamethylene diacrylate.

The number average molecular weight of the copolymer C is preferably Mn=500-30 000, in particular 1000-10 000. (Determination by means of Size Exclusion Chromatography (SEC) against polystyrene standard, in DMF/Methanol (proportions by volume 1/1+1 g/l of ammonium formate), at 35° C., flow rate 0.5 ml/min and detection using RI (refractive index detector) on a Polargel column from Agilent (injection volume 20 μl)).

The copolymer C is preferably used as alkali metal or alkaline earth metal salt. Preference is given to the sodium or lithium salt, particularly preferably the sodium salt. For example, the monomers can be used as sodium salt or, in a preferred embodiment, appropriate proportions of the monomer units of acrylic acid or acrylic acid derivatives in the finished copolymer can be converted into the sodium or lithium salt by addition of sodium or lithium hydroxide. Preference is given to 5-80%, particularly preferably 10-50%, in particular 20-40% (=mol percent) of the acrylic acid or acrylic acid derivative monomer units in the copolymer C being converted into the sodium or lithium salt by addition of sodium or lithium hydroxide.

The copolymer C serves as binder in the electrode coating.

In the production of the electrode coating, preference is given to applying, preferably by doctor blade coating, an electrode ink, also referred to as electrode paste, in a dry layer thickness of from 2 μm to 500 μm, preferably from 10 μm to 300 μm, in particular 50-300 μm to a current collector, for example copper foil.

Other coating processes such as spin coating, dip coating, painting or spraying can likewise be used. Before coating of the copper foil with the electrode ink, a treatment of the copper foil with a commercial primer, e.g. a primer based on polymer resins, can be carried out. This increases the adhesion to the copper but itself has virtually no electrochemical activity.

The electrode ink is preferably dried to constant weight. The drying temperature depends on the materials used and the solvent employed. It is preferably in the range from 20° C. to 300° C., particularly preferably from 50° C. to 150° C.

Finally, the electrode coatings can be calendered in order to set a defined porosity.

The capacity per unit area of the electrode coating is preferably >1.5 mAh/cm$^2$, particularly preferably >2 mAh/cm$^2$.

The electrode coating and electrode ink contain the copolymer C and one or more active materials.

The active material for the electrode coating and electrode ink contains elements and compounds thereof selected from among carbon, silicon, lithium, tin, titanium and oxygen. The active material for the electrode coating preferably contains silicon.

Preferred active materials are silicon, silicon oxide, graphite, silicon-carbon composites, tin, lithium, aluminum, lithium-titanium oxide and lithium silicide. Particular preference is given to graphite and silicon and also silicon-carbon composites.

When silicon is used as active material, the primary particle size of the silicon is preferably 1-1000 nm, more preferably 50-300 nm.

The proportion of silicon in the active material is preferably 5-90% by weight, particularly preferably 5-40% by weight.

The proportion of graphite in the active material is preferably 10-95% by weight, particularly preferably 60-95% by weight.

In addition, further conductive materials such as conductive carbon black, carbon nanotubes (CNT) and metal powder can be present in the electrode ink and electrode coating.

The electrode ink and electrode coating can also contain further additives which, in particular, serve to set the wetting properties or to increase the conductivity, and also dispersants, fillers and pore formers.

The electrode ink preferably contains water as solvent.

The proportion of copolymer C based on the electrode coating or the dry weight of the electrode ink is preferably 1% by weight-50% by weight, particularly preferably 2% by weight-30% by weight, in particular 3% by weight-15% by weight. The solids content of the electrode ink is 5% by weight-95% by weight, particularly preferably 10% by weight-50% by weight, in particular 15% by weight-30% by weight.

The electrode ink can be produced, for example, by means of speed mixers, dissolvers, rotor-stator machines, high-energy mills, planetary kneaders, stirred ball mills, shaking tables or ultrasonic apparatuses.

The copolymer C is outstandingly suitable as electrochemically stable binder system for electrode inks in lithium ion batteries. Conversion of the copolymer C into the alkali metal or alkaline earth metal salt, in particular conversion into the sodium salt, sets or fixes the rheological behavior of the copolymer C and its solubility in water.

The copolymer C can therefore be processed as binder from water (e.g. in the form of its sodium salt) and organic solution (e.g. from NMP or alcohols).

The alkali metal or alkaline earth metal salts of the copolymer C are soluble in water; the binder formulation for electrode inks can be processed from aqueous solution. Preference is given to at least 80 g/l, in particular at least 120 g/l of the copolymer C being soluble in water at 25° C. and 1 bar.

Aqueous processing is the preferred processing method of many anode manufacturers for ecological reasons. The advantage of organic solutions over water is the reduced surface oxidation of the silicon particles for better coulombic efficiency and better long-term stability (applied materials & interfaces (2010), Vol. 2, 3004-3010). Both can be achieved using copolymer C as binder.

The copolymer C stands out due to the fact that it can, in particular, be prepared in a simple way since commercially available monomers can be used. Surprisingly, a high cycling stability and a low internal resistance, in particular, can be achieved by means of the copolymer C according to the invention. The binder described here is surprisingly also usable for silicon anodes, unlike the homopolymer of vinylene carbonate, and leads to a high cycling stability.

In particular, copolymer C is outstandingly suitable as binder for the processing of unaggregated silicon particles as are formed, for example, by milling (see, for example, DE 102013211388).

The copolymer C allows simple single-stage formulation of a sedimentation-stable electrode ink from aqueous or organic solution, and this ink can be processed directly by doctor blade coating onto the electrode support (=current collector).

Lithium ion batteries whose electrode inks contain the copolymer C display a high cycling stability even at high loadings per unit area. On the other hand, standard binders display a high cycling stability in Si-containing systems only at low loadings per unit area.

The copolymer C is preferably used in a lithium ion battery which contains cathode, anode, separator and an electrolyte, with at least one of the electrodes containing the copolymer C.

As cathode material, it is possible to use, for example, Li metal, for example as foil, and lithium compounds such as lithium-cobalt oxide, lithium-nickel oxide, lithium-nickel-cobalt oxide (doped and undoped), lithium-manganese oxide (spinels), lithium-nickel-cobalt-manganese oxides, lithium-nickel-manganese oxides, lithium-iron phosphate, lithium-cobalt phosphate, lithium-manganese phosphate, lithium-vanadium phosphate or lithium-vanadium oxides.

The separator is, for example, a membrane which is permeable only to ions, as is known in battery manufacture. The separator separates the anode from the cathode.

The electrolyte contains lithium salt as electrolyte salt and aprotic solvent.

Electrolyte salts which can be used are, for example, $LiPF_6$, $LiBF_4$, $LiClO_4$, $LiAsF_6$, $LiB(C_2O_4)_2$, $LiBF_2(C_2O_4)$, $LiSO_3C_xF_{2x+1}$, $LiN(SO_2C_xF_{2x+1})_2$ and $LiC(SO_2CxF_{2x+1})_3$, where x assumes integral values from 0 to 8, and mixtures thereof.

The electrolyte preferably contains from 0.1 mol/l to the solubility limit of the electrolyte salt, particularly preferably 0.2 mol/l-3 mol/l, in particular from 0.5 to 2 mol/l of lithium-containing electrolyte salt.

The aprotic solvent is preferably selected from among organic carbonates such as dimethyl carbonate, diethyl carbonate, ethyl methyl carbonate, ethylene carbonate, vinylene carbonate, propylene carbonate, butylene carbonate; cyclic and linear esters such as methyl acetate, ethyl acetate, butyl acetate, propyl propionate, ethyl butyrate, ethyl isobutyrate; cyclic and linear ethers such as 2-methyltetrahydrofuran, 1,2-diethoxymethane, THF, dioxane, 1,3-dioxolane, diisopropyl ether, diethylene glycol dimethyl ether; ketones such as cyclopentanone, di-isopropyl ketone, methyl isobutyl ketone; lactones such as γ-butyrolactone; sulfolanes, dimethyl sulfoxide, formamide, dimethylformamide, 3-methyl-1,3-oxazolidin-2-one, acetonitrile, organic carbonic esters and nitriles and mixtures of these solvents. Particular preference is given to the organic carbonates described above.

The electrolyte preferably also contains a film former such as vinylene carbonate, fluoroethylene carbonate, vinylethylene carbonate or fluoroacetone, as a result of which a significant improvement in the cycling stability of the anode can be achieved. This is ascribed mainly to the formation of a solid electrolyte intermediate phase on the surface of the active materials. The proportion of the film former in the electrolyte is preferably 01% by weight-20.0% by weight, particularly preferably 0.2% by weight-15.0% by weight, in particular 0.5% by weight-10% by weight.

In a particular embodiment, the lithium ion battery contains graphite as sole anode material.

The electrolyte can, as described, for example in DE 10027626 A, also contain further additives such as organic isocyanates to reduce the water content, HF scavengers, redox shuttle additives, flame retardants such as phosphates or phosphonates, solubilizers for LiF, organic lithium salts and/or complex salts.

The lithium ion battery can be produced in all customary forms in rolled, folded or stacked form.

All substances and materials utilized for producing the lithium ion battery, as described above, are known. Production of the parts of the battery and assembly of these to give the battery according to the invention are carried out by processes which are known in the field of battery production.

In the following examples, unless indicated otherwise in each case, all amounts and percentages are by weight, all pressures are 0.10 MPa (abs.) and all temperatures are 23° C. The solvents and electrolytes used were dried by standard methods and stored under a dry argon atmosphere.

The following materials were procured from commercial sources and used directly without further purification: graphite KS6L-C (Timcal), acrylic acid (Sigma Aldrich), carboxymethylcellulose (CMC) (Daicel 1360), ethanol (Sigma Aldrich), AIBN (aza-bis-isobutyronitrile) (Sigma Aldrich), sodium hydroxide (Sigma Aldrich), diethyl ether (Sigma Aldrich), dimethylformamide (DMF) (Sigma Aldrich).

Vinylene carbonate (Sigma Aldrich) was purified over basic $Al_2O_3$ before use.

The electrochemical studies were carried out on a half cell in a three-electrode arrangement (zero-current potential measurement). The electrode coating from the respective example was used as working electrode, and lithium foils (Rockwood® lithium, thickness 0.5 mm) were used as reference electrode and counterelectrode. A six-layer stack of nonwoven (Freudenberg Vliesstoffe, FS2226E) impregnated with 100 μl of electrolyte served as separator. The electrolyte used consisted of a 1 molar solution of lithium hexafluorophosphate in a 3:7 (v/v) mixture of ethylene carbonate and diethyl carbonate which had been admixed with 2% by weight of vinylene carbonate. The cell was constructed in a Glove box (<1 ppm $H_2O$, $O_2$), and the water content in the dry mass of all components used was less than 20 ppm.

COMPARATIVE EXAMPLE 1 polyVC

The preparation of polyVC was carried out as described by H. Zhao et al. Journal of Power Sources 263 (2014) 288-295.

4.41 g of a 22% strength by weight silicon suspension in ethanol having a particle size of d50 =180 nm (unaggregated silicon particles, cf., for example, DE 102013211388) and 0.60 g of conductive carbon black (Timcal® Super C65) were dispersed in 15.00 g of a 2.5% strength by weight solution of polyVC, in DMF by means of a speed mixer at a rotational speed of 2500 rpm for 5 minutes and subsequently by means of a dissolver at a circumferential velocity of 9 m/s for 15 minutes while cooling at 20° C. After addition of 2.83 g of graphite (Timcal® SFG6) and 9.0 g of DMF, the mixture was then mixed by means of a speed mixer at a rotational speed of 2500 rpm for 5 minutes and by means of a dissolver at a circumferential velocity of 8 m/s for 15 minutes. After degassing in the speed mixer, the dispersion was applied by means of a film drawing frame having a gap height of 0.25 mm (Erichsen, model 360) to a copper foil (Schlenk Metallfolien, SE-Cu58) having a thickness of 0.030 mm. The electrode coating produced in this way was subsequently dried for 60 minutes at 80° C. and 1 bar of air pressure. The average weight per unit area of the dry electrode coating was 2.51 mg/cm$^2$.

The electrochemical testing was carried out at 20° C. 40 mV and 1.0 V vs. Li/Li+ were used as potential limits. The charging or lithiation of the electrode was carried out by the cc/cv method (constant current/constant voltage) with a constant current and, after reaching the voltage limit, at a constant voltage until the current dropped below 50 mA/g. The discharging or delithiation of the electrode was carried out by the cc method (constant current) with a constant current until the voltage limit was reached. The specific current selected was based on the weight of the electrode coating.

The electrode coating from comparative example 1 had a reversible initial capacity of about 522 mAh/g and after 70 charging/discharging cycles had about 28% of its original capacity, and after 100 cycles 22% of its original capacity.

EXAMPLE 2

Poly(VC-co-AA)

Weights Used:
- 2.35 g of vinylene carbonate=27 mmol
- 1.95 g of acrylic acid=27 mmol
- 0.05 g=0.06 mmol of AIBN Procedure:

The two monomers were dissolved in one another without additional solvent and admixed with half of the AIBN (0.025 g) and degassed in a 50 ml 3-neck flask.

The mixture was subsequently polymerized at 70° C. After three hours, the remaining amount of AIBN (0.025 g) was added and polymerization was continued at 70° C. for 16 hours.

Work-up:

The polymer was dissolved in 30 ml of DMF at 90° C. and reprecipitated from 50 ml of diethyl ether. The polymer was dried at 70° C. under reduced pressure.

Mn=2500 g/mol (GPC)

Neutralization:
- 0.6 g of polymer was dissolved in 5.0 g of DMF.
- 45 mg of NaOH were dissolved in 0.5 g of water.

Procedure:

The aqueous NaOH was stirred dropwise into the polymer solution.

A precipitate is formed and this is redissolved by addition of water. Water is added until a solids content of 2% by weight is reached (=2.5% strength binder solution).

4.41 g of a 22% strength by weight silicon suspension in ethanol having a particle size of d50=180 nm (unaggregated silicon particle) and 0.6 g of conductive carbon black (Timcal® Super C65) were dispersed in 15.00 g of the abovementioned binder solution by means of a speed mixer at a rotational speed of 2500 rpm for 5 minutes and subsequently by means of a dissolver at a circumferential velocity of 9 m/s for 15 minutes while cooling at 20° C. After addition of 2.83 g of graphite (Timcal® SFG6) and 7 g of water, the mixture was then mixed by means of a speed mixer at a rotational speed of 2500 rpm for 5 minutes and by means of a dissolver at a circumferential velocity of 8 m/s for 15 minutes. After degassing in the speed mixer, the dispersion was applied by means of a film drawing frame having a gap height of 0.25 mm (Erichsen, model 360) to a copper foil (Schlenk Metallfolien, SE-Cu58) having a thickness of 0.030 mm. The electrode coating produced in this way was subsequently dried for 60 minutes at 80° C. and 1 bar of air pressure. The average weight per unit area of the dry electrode coating was 2.51 mg/cm$^2$.

The electrochemical testing was carried out at 20° C. 40 mV and 1.0 V vs. Li/Li+ were used as potential limits. The charging or lithiation of the electrode was carried out by the cc/cv method (constant current/constant voltage) with a constant current and, after reaching the voltage limit, at a constant voltage until the current dropped below 50 mA/g. The discharging or delithiation of the electrode was carried out by the cc method (constant current) with a constant current until the voltage limit was reached. The specific current selected was based on the weight of the electrode coating.

The electrode coating from example 2 had a reversible initial capacity of about 716 mAh/g and after 70 charging/discharging cycles still had about 99% of its original capacity. After 100 charging/discharging cycles, it had about 84% of its original capacity.

COMPARATIVE EXAMPLE 3

CMC Binder 4.41 g of a 22% strength by weight silicon suspension in ethanol having a particle size of d50=180 nm (unaggregated silicon particles) and 0.6 g of conductive carbon black (Timcal® Super C65) were dispersed in 15.00 g of a 2.5% strength by weight solution of CMC in water by means of a speed mixer at a rotational speed of 2500 rpm for 5 minutes and subsequently by means of a dissolver at a circumferential velocity of 9 m/s for 15 minutes while cooling at 20° C. After addition of 2.83 g of graphite (Timcal® SFG6) and 4 g of water, the mixture was then mixed by means of a speed mixer at a rotational speed of 2500 rpm for 5 minutes and by means of a dissolver at a circumferential velocity of 8 m/s for 15 minutes. After degassing in the speed mixer, the dispersion was applied by means of a film drawing frame having a gap height of 0.25 mm (Erichsen, model 360) to a copper foil (Schlenk Metallfolien, SE-Cu58) having a thickness of 0.030 mm. The electrode coating produced in this way was subsequently dried for 60 minutes at 80° C. and 1 bar of air pressure. The average weight per unit area of the dry electrode coating was 2.20 mg/cm$^2$.

The electrochemical testing was carried out at 20° C. 40 mV and 1.0 V vs. Li/Li+ were used as potential limits. The charging or lithiation of the electrode was carried out by the cc/cv method (constant current/constant voltage) with a constant current and, after reaching the voltage limit, at a constant voltage until the current dropped below 50 mA/g. The discharging or delithiation of the electrode was carried out by the cc method (constant current) with a constant current until the voltage limit was reached. The specific current selected was based on the weight of the electrode coating.

The electrode coating from comparative example 3 had a reversible initial capacity of about 694 mAh/g and after 70 charging/discharging cycles had about 78% of its original capacity, and after 100 cycles about 64% of its original capacity.

TABLE 1

Capacity and resistance trends over 70 and 100 cycles.

| Material | Binder | Reversible initial capacity [mAh/g] | Capacity retention after 70/100 cycles [%] | Internal resistance after 70/100 cycles [mOhm/cm$^2$] |
|---|---|---|---|---|
| Comp. Ex. 1* | PolyVC | 522 | 28/22 | 152.6/183.6 |
| Ex. 2 | Poly (VC-co-AA) | 744 | 99/84 | 33.5/31.7 |
| Comp. Ex. 3* | CMC | 694 | 78/64 | 72.5/119.0 |

*not according to the invention

The determination of the internal resistance was carried out by applying a current of 200 mA/g to the cell having a completely delithiated Si electrode, which cell was not being loaded with a current. From the difference of the cell voltages in the unloaded and loaded (measured after one second) state, the internal resistance was calculated according to Ohm's law R×A=ΔU/I (R=internal resistance, A=electrode area, ΔU=voltage difference unloaded/loaded, I=current)

Compared to comparative example 1, example 2 showed a significantly higher initial capacity (=higher utilization of the theoretical capacity) together with a higher capacity retention. Only example 2 still had a high cycling stability with a capacity retention of >80% after 100 cycles.

Comparative example 3 using CMC as standard binder had a higher stability than polyVC. However, due to the significant increase in the internal resistance at high loadings, the cycling stability of the poly(VC-co-AA) binder according to the invention of example 2 could not be achieved.

The invention claimed is:

1. An electrode coating for a lithium ion battery, said electrode coating comprising silicon as an active material and a copolymer C or a salt thereof, wherein the copolymer C or salt thereof can be prepared by polymerization of a combination of the following monomers: (a) vinyl-functional cyclic carbonate monomers, (b) one or more monomers selected from the group consisting of acrylic acid and derivatives thereof, and optionally (c) at least one further monomer, where monomers (a) and (b) together constitute more than 70% by weight of the combination of monomers, and monomer (a) constitutes 5-90% by weight of the combination of monomers.

2. The electrode coating as claimed in claim 1, wherein the acrylic acid in the copolymer C constitutes 30-85% by weight of the combination of monomers.

3. The electrode coating as claimed claim 2, wherein the monomers from which the copolymer C is prepared are selected from the group consisting of vinyl-functional cyclic carbonate monomers, acrylic acid monomers and derivatives of acrylic acid monomers.

4. The electrode coating as claimed in claim 3, wherein a number average molar mass of the copolymer C is Mn=500-30000.

5. The electrode coating as claimed in claim 4, which contains a sodium or lithium salt of the copolymer C.

6. The electrode coating as claimed claim 1, wherein the monomers from which the copolymer C is prepared are selected from the group consisting of vinyl-functional cyclic carbonate monomers, acrylic acid monomers and derivatives of acrylic acid monomers.

7. The electrode coating as claimed in claim 1, wherein a number average molar mass of the copolymer C is Mn=500-30000.

8. The electrode coating as claimed in claim 1, which contains a sodium or lithium salt of the copolymer C.

* * * * *